(12) United States Patent
Pan et al.

(10) Patent No.: US 7,635,216 B2
(45) Date of Patent: Dec. 22, 2009

(54) BACKLIGHT STRUCTURE

(75) Inventors: Chih-Liang Pan, Taipei (TW); Shih-Wu Yuan, Taipei (TW); I-Jan Wang, Shanhua Township, Tainan County (TW)

(73) Assignee: AU Optronics Corporation, Hsinchu (TW)

( * ) Notice: Subject to any disclaimer, the term of this patent is extended or adjusted under 35 U.S.C. 154(b) by 21 days.

(21) Appl. No.: 11/475,143

(22) Filed: Jun. 27, 2006

(65) Prior Publication Data

US 2007/0171668 A1   Jul. 26, 2007

(30) Foreign Application Priority Data

Jan. 23, 2006   (TW) ............... 95102551 A

(51) Int. Cl.
*F21V 7/04*  (2006.01)
(52) U.S. Cl. ................ 362/614; 362/621; 313/631
(58) Field of Classification Search .......... 362/615, 362/614, 611, 618, 621, 622, 626, 605; 313/631, 313/632, 574
See application file for complete search history.

(56) References Cited

U.S. PATENT DOCUMENTS

| | | | | |
|---|---|---|---|---|
| 5,528,709 A | * | 6/1996 | Koike et al. ............ | 385/14 |
| 5,619,351 A | * | 4/1997 | Funamoto et al. ....... | 349/61 |
| 5,854,872 A | * | 12/1998 | Tai .................... | 385/133 |
| 5,857,761 A | * | 1/1999 | Abe et al. .............. | 362/551 |
| 6,048,071 A | * | 4/2000 | Sawayama .............. | 362/603 |
| 6,079,838 A | * | 6/2000 | Parker et al. ........... | 362/617 |
| 6,337,539 B1 | * | 1/2002 | Yorifuji et al. .......... | 315/56 |
| 6,502,947 B2 | * | 1/2003 | Matsumoto et al. ...... | 362/626 |
| 6,530,669 B2 | * | 3/2003 | Toyoda ................. | 362/610 |
| 6,540,377 B1 | * | 4/2003 | Ota et al. .............. | 362/231 |
| 7,048,427 B2 | * | 5/2006 | Fujino et al. ........... | 362/621 |
| 2005/0140835 A1 | * | 6/2005 | Maeda et al. ........... | 349/28 |
| 2005/0201121 A1 | * | 9/2005 | Chen et al. ............ | 362/615 |
| 2007/0217224 A1 | * | 9/2007 | Kao et al. ............. | 362/615 |
| 2007/0263409 A1 | * | 11/2007 | Mok ................... | 362/612 |

FOREIGN PATENT DOCUMENTS

JP   2005019066   1/2005

* cited by examiner

*Primary Examiner*—Gunyoung T Lee
(74) *Attorney, Agent, or Firm*—Rosenberg, Klein & Lee

(57) ABSTRACT

A backlight structure comprises a light-guide plate and a light source module. There is a light-entering surface, which is a burnished surface, on one side of the light-guide plate. Besides, there is an effective light-emitting area on the light source module, and there is a distance between the centerline of which area and that of the light-entering surface. Thereby, the luminance on the bottom-left corner of the backlight structure is made identical to the luminance on the bottom-right corner by increasing the propagation ranges of the light on the bottom-left and the bottom-right corners as a result of a burnish surface as well as of asymmetrically adapting the light source module.

22 Claims, 7 Drawing Sheets

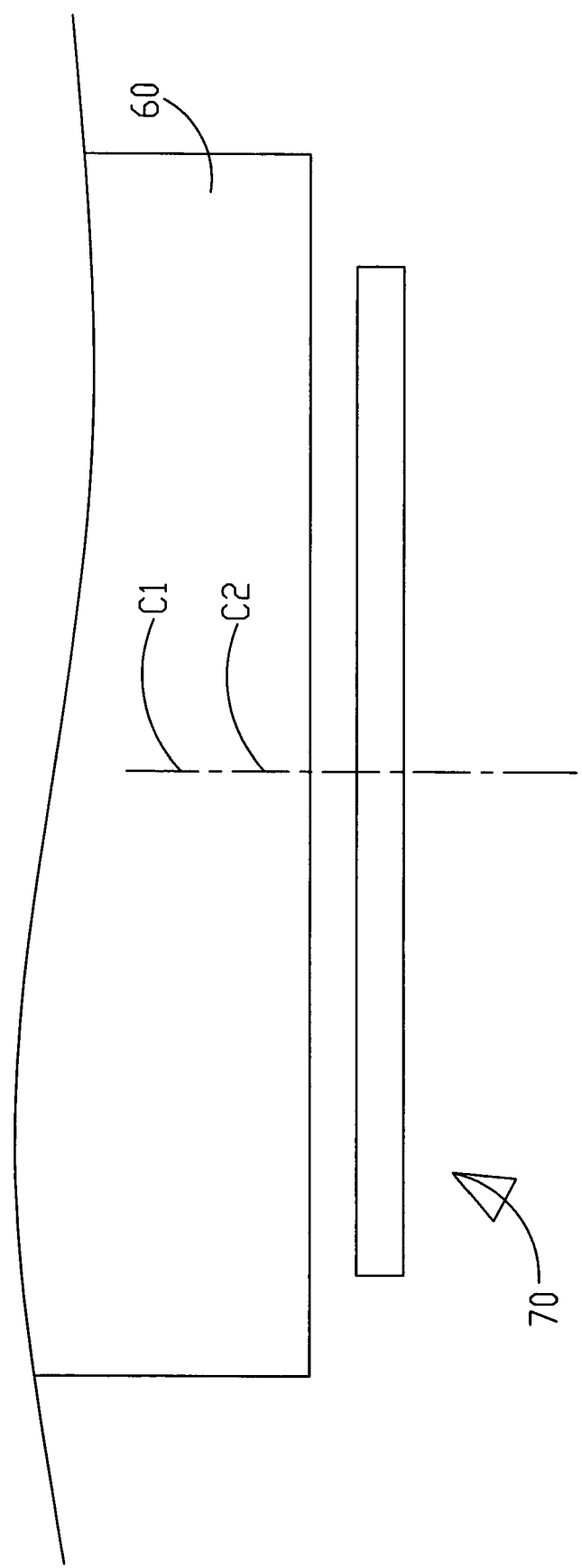

BACKLIGHT STRUCTURE

FIELD OF THE INVENTION

The present invention relates to a backlight structure.

BACKGROUND OF THE INVENTION

The applications of backlight structures are common in everyday life such as digital cameras, digital Walkman's, cellular phones, televisions, and computers. Taking computers for example, the mainstream of modern computer displays is liquid crystal displays. Any trail of traditional cathode ray tube displays is hardly seen. Owing to the trend, lightness, thinness, shortness, smallness, as well as high performance have become concepts of the invention of technical products. A notebook computer is an invented product based on the concepts. The majority of the displays of notebook computers adopt backlight structures as their light sources. In order to conform to the invention concepts of lightness, thinness, shortness, smallness, and high performance, backlight structures with a V-cut light-entering side have gradually become the main stream. The framework thereof can adopt fewer optical thin films to concentrate light energies on the normal viewing angle such that the purposes of lightness, thinness, as well as high luminance can be achieved.

Please refer to FIGS. 1 and 2 altogether, which are a structural schematic diagram and a cross-section view of a backlight structure according to the prior art. As shown in the figures, the backlight structure with a V-cut light-entering side according to the prior art comprises a light-guide plate 10, a reflector plate 20, a lamp 30, and a lampshade 40. The reflector plate 20 is adapted beneath the light-guide plat 10, and the lamp 30 is adapted on one side of the light-guide plate 10. The lamp 30 is a cold cathode fluorescent lamp. A plurality of insulating sleeves 36 covers both sides of the lamp 30, and the plurality insulating sleeves 36 is made to shield electrodes 335 on both sides, respectively. In addition, the lampshade 40 is adapted on one aide of the light-guide plate 10 and covers the lamp 30.

By means of the insulating sleeves 36, the electrodes 335 on both sides of the lamp 30 are protected so that the short-circuit problem of the lamp 30 can prevented. Furthermore, In the process of assembling the backlight structure, both sides of the lamp 30 are soldered with high- and low-voltage wires first. Then the insulating sleeves 36 are slip on, and surround the lamp 30. Afterwards, the lamp 30 and the lampshade 40 are assembled. When the lamp 30 and the lampshade 40 are assembled, the inner sides of the insulating sleeves 36 on both sides of the lamp 30 will overlap with the lampshade 40, and will plug the insulating sleeves 36 into the opening of the lampshade 40. The insulating sleeves 36 will be fixed temporarily inside the opening of the lampshade 40 for later use in the assembly procedure.

Nevertheless, most of the insulating sleeves 36 are made of plastic, compressive, and flameproof rubber materials. If the materials are opaque, the propagation of light will be shaded to some degree. Notebook computers adopt the backlight structure with a V-cut as their light source to meet the requirement of designing with lightness, thinness, shortness, and smallness. However, because of the backlight structure with a V-cut, light is difficult to propagate parallel to the direction of the lamp 30 in the light-guide plate 10. As a result, the luminance at bottom-left and bottom-right corners is relatively low, which in turn makes the bottom-left and bottom-right corners of the display appear darker.

Another method is thereby adopted. In which method, the lampshade 40 that is a transparent is used to make part of light pass through it and illuminate to the bottom-left and bottom-right corners of the light-guide plate 10. Nonetheless, in the regard of the backlight structure, the temperature on the lampshade 40 after the illumination of the lamp 30 is quite high. If the transparent lampshade 40 is used, then the transparent material of the transparent lampshade 40 will face the problem of being unable to endure high temperatures. That is to say, the problem of bad flameproof characteristics will occur. Moreover, the transparent material will cause the concern of yellowing after using it in a high-temperature environment for a period of time.

Accordingly, another method is used. Burnish using special cutting tools is applied on the light-entering surface of the light-guide plate 10, that is, the side on which the light-guide plate 10 and the lamp 30 adjoin, so that more light can propagate towards the bottom-left and the bottom-right corners of the light-guide plate 10. Alternatively, a surface-roughening process can be applied on the bottom-left and the bottom-right corners of the light-exiting surface of the light-guide plate 10 so that the luminance on the bottom-left and on the bottom-right corners of the light-guide plate 10 is increased. However, the method of increasing local luminance by burnish is unidirectional burnish. That is to say, the cutting tools have to burnish from left to right, which will make the direction of the light in the light-guide plate 10 be oblique towards right, increasing the luminance of the bottom-right corner while decreasing relatively even more the luminance of the bottom-left. Alternatively, burnish can be done from right to left, which will make the direction of the light in the light-guide plate 10 be oblique towards left, increasing the luminance of the bottom-left corner while decreasing relatively even more the luminance of the bottom-right.

If burnish is done on the light-entering surface of the light-guide plate 10 from left to right first and then from right to left, the luminance on the bottom-left and the bottom-right corners of the light-guide plate 10 does not increase remarkably. In other words, by using the cutting tools to make the surface microstructure of the light-entering surface asymmetric, the light entering the light-guide plate will scatter unidirectionally.

Accordingly, the present invention provides a backlight structure, which can increase the luminance on the bottom-left and on the bottom-right corners of the light-guide plate. Thereby, the problem described above can be solved.

SUMMARY

The purpose of the present invention is to provide a backlight structure, which makes the luminance on the bottom-left and on the bottom-right corners of the backlight structure be identical by increasing the propagation ranges of the light on the bottom-left and the bottom-right corners as a result of a burnish process on the light-entering surface of the light-guide plate, and of making the illumination area of the light source module on the light-guide plate be asymmetric.

Another purpose of the present invention is to provide a backlight structure, which makes the luminance on the bottom-left and on the bottom-right corners of the backlight structure be identical by increasing the propagation ranges of the light on the bottom-left and the bottom-right corners as a result of a burnish process on the light-entering surface of the light-guide plate, and of adapting one of the two electrodes of the light source module to be a short electrode.

Still another purpose of the present invention is to provide a backlight structure, which makes the luminance on the bottom-left and on the bottom-right corners of the backlight structure be identical by increasing the propagation ranges of the light on the bottom-left and the bottom-right corners as a result of a burnish process on the light-entering surface of the light-guide plate, and of making the coverage area by at least one of the two insulating sleeves on the light source smaller.

The present invention relates to a backlight structure, which comprises a light-guide plate and a light source module. There is a light-entering surface, which is a burnished surface, on one side of the light-guide plate. Besides, there is an effective light-emitting area on the light source module, and there is a distance between the centerline of which area and that of the light-entering surface. The light source module comprises a cold cathode lamp and at least two insulating sleeves, which are slip on both sides of the cold cathode lamp, and makes one of the insulating sleeves have a shielding part. The shielding part extends to and covers the inner side of the cold cathode lamp, or the length of a first electrode on one side of the cold cathode lamp is made to be longer than the length of a second electrode of the other side. In addition, the insulating sleeves are slip on the first and the second electrodes, respectively. Thereby, the luminance on the bottom-left corner is equal to the luminance on the bottom-right corner.

BRIEF DESCRIPTION OF THE DRAWINGS

FIG. 3B is a schematic diagram of a light-guide plate and a light source module of a backlight structure prior to disposal according to a preferred embodiment of the present invention;

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
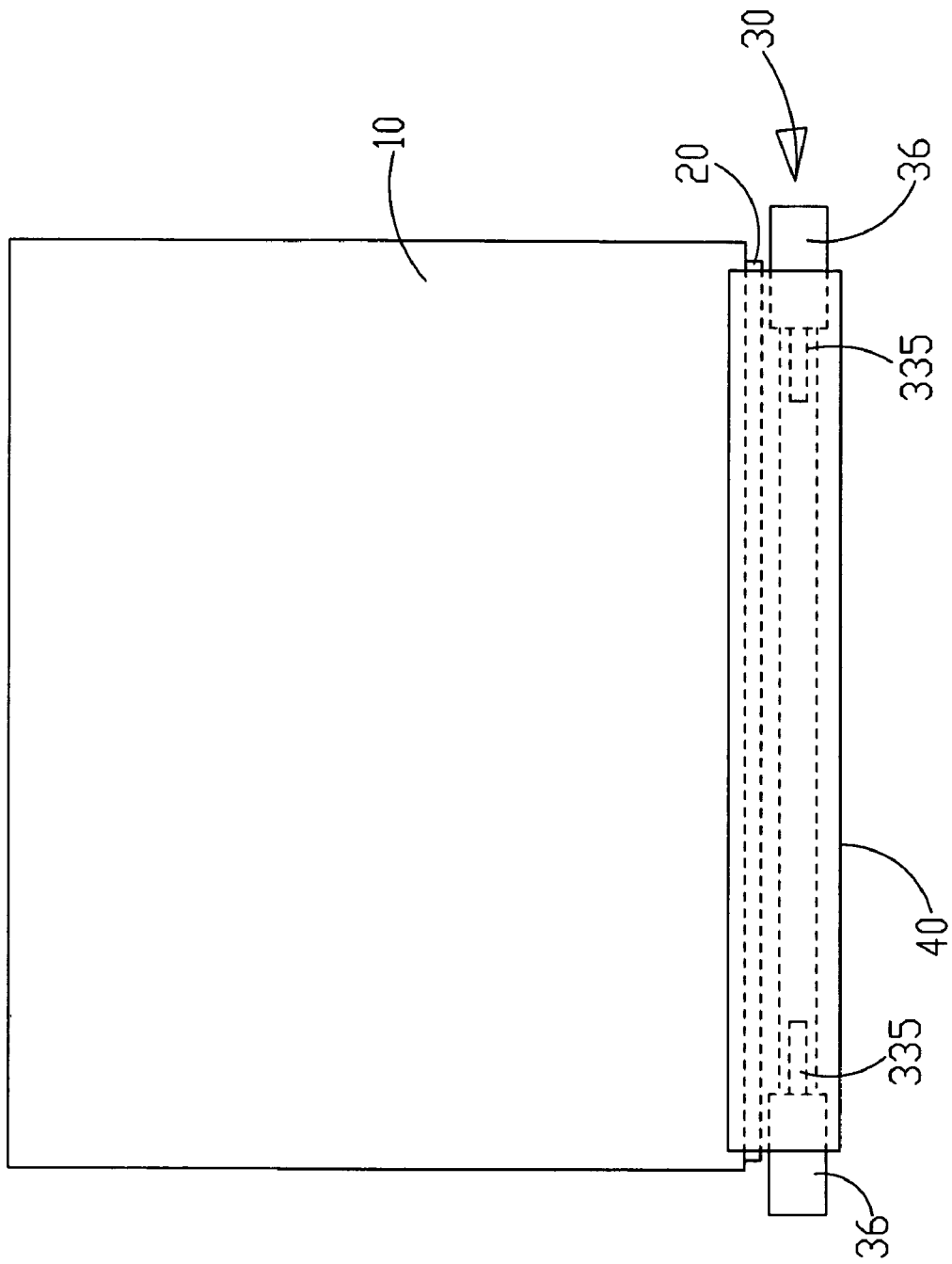
FIG. 1 is a structural schematic diagram of a backlight structure with a V-cut light-entering side according to the prior art.
Figure 2:
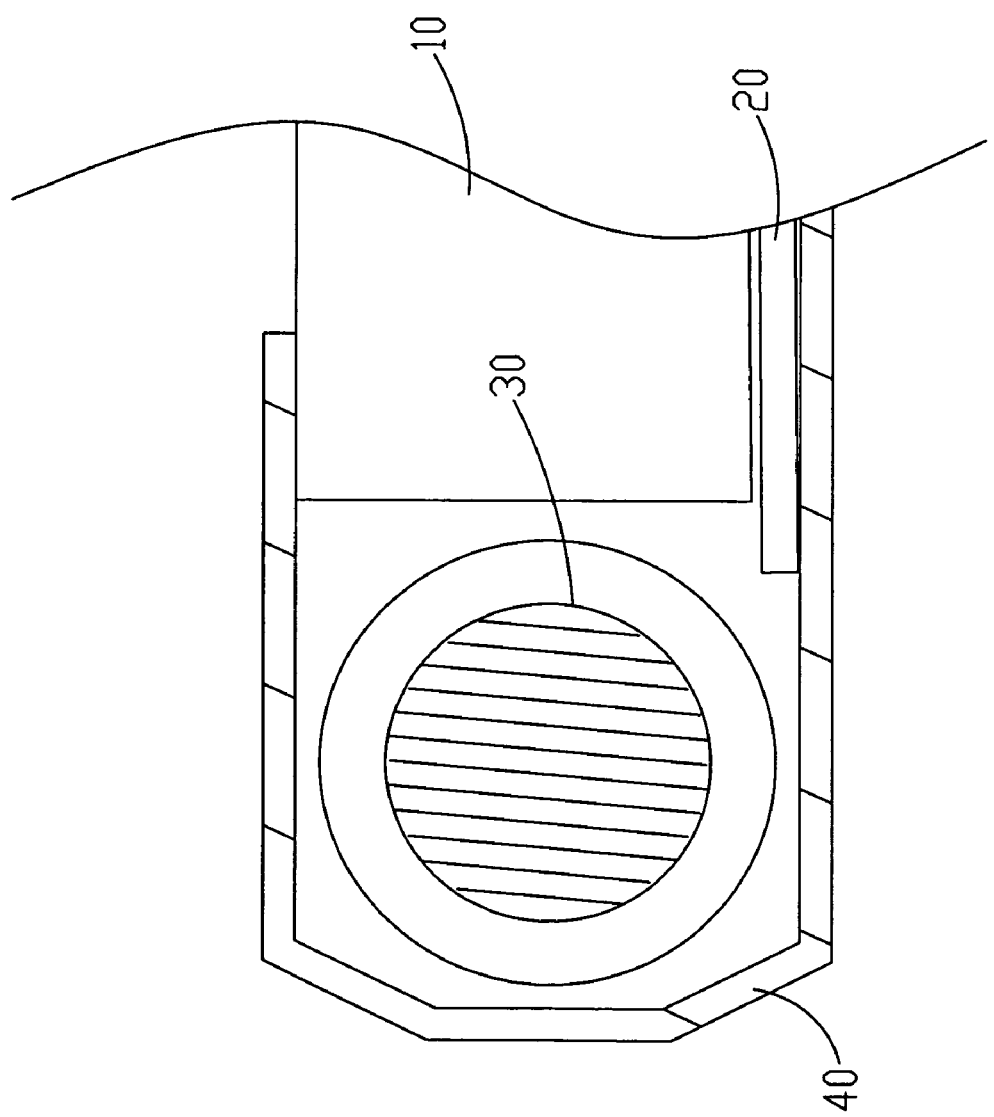
FIG. 2 is a cross-section view of a backlight structure with a V-cut light-entering side according to the prior art.
Figure 3A:
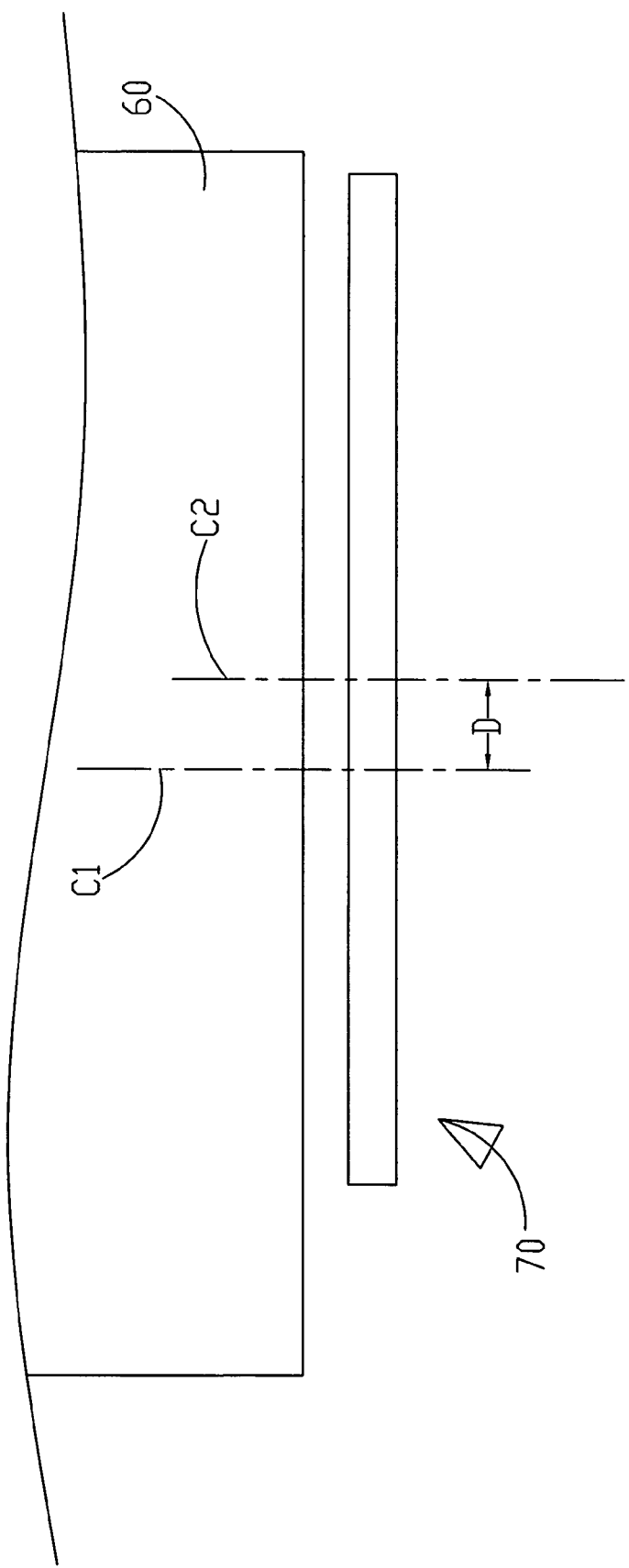
FIG. 3A is a structural schematic diagram of a backlight structure according to a preferred embodiment of the present invention.

Please refer to FIG. 3A, which is a structural schematic diagram of a backlight structure according to a preferred embodiment of the present invention. As shown in the figure, the backlight structure according to the present invention comprises a light-guide plate 60 and a light source module 70. There is a light-entering surface 62 on one side of the light-guide plate 60. Besides, there is an effective light-emitting area 625 on the light source module 70, and there is a distance D between the centerline C1 of which area and the centerline C2 of the light-entering surface 62. Thereby, the luminance on the bottom-left and on the bottom-right corners of the backlight structure can be made identical by increasing the propagation ranges of the light on the bottom-left and the bottom-right corners as a result of asymmetrically adapting the light source module 70. The effective light-emitting area 625 of the light source module 70 and the light-entering surface 62 of the light-guide plate 60 are adapted asymmetrically, thereby the propagation ranges of the light on the bottom-left and the bottom-right corners are balanced. Consequently, the luminance on the bottom-left corner of the backlight structure is made identical to the luminance on the bottom-right corner.

In the prior art, the light source module 70 is adapted at the central position of the light-entering surface 62, and the light enters through the light-entering surface 62 and exits from the light-exiting surface of the light-guide plate 60. However, ash shown in FIG. 3B, owing to the grinding process of the light-guide plate 60, the microstructure thereon will result in unevenness in luminance on the bottom-left and on the bottom-right corners. Thereby, if the light source module 70 is adapted at the off-center position of the light-entering surface 62, as shown in FIG. 3A, there is a distance D between the centerline C1 of the light source module 70 and the centerline C2 of the light-guide plate, forming an off-center-position installation. As shown in the figure, the light source module 70 is adapted at the center-right position of the light-entering surface 62 to increase the luminance on the bottom-right corner of the light-guide plate 60. On the other hand, if the luminance on the bottom-left corner of the light-guide plate 60, the light source module 70 is adapted at the center-left position of the light-entering surface 62. Accordingly, the problem of darker luminance on the bottom-left or the bottom-right corners of the light-guide plate 60 can be solved.

Figure 4:
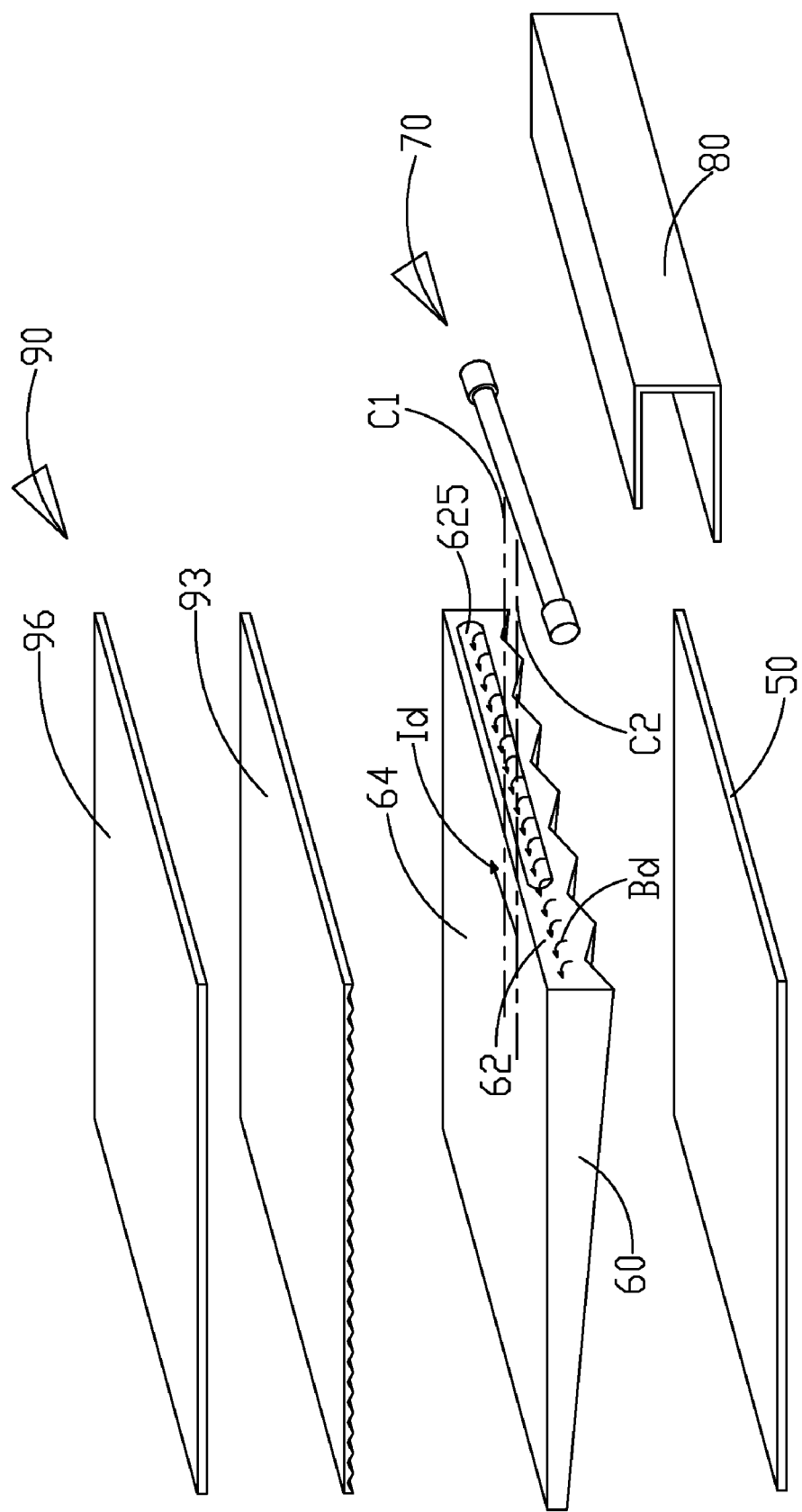
FIG. 4 is an explosion view of a backlight structure according to a preferred embodiment of the present invention.

Please refer to FIG. 4, which is an explosion view of a backlight structure according to a preferred embodiment of the present invention. As shown in the figure, the backlight structure according to the present invention is an edge-type backlight module comprising a reflector plate 50, a light-guide plate 60, and a light source module 70. The light-guide plate 60 is adapted on the reflector plate 50. In the present invention, a V-cut light-guide plate is taken as an example. There is a light-entering surface 62 on one side of the light-guide plate. In addition, the light source module 70 can be a cold cathode lamp, and the effective light-emitting area 625 of the light source module 70 is smaller than the area of the light-entering surface 62.

Because the technology described above can only increase the luminance at a single location, for example, the bottom-right corner or the bottom-left corner, in order to balance the luminance on the bottom-left and the bottom-right corners of the light-guide plate 60, the light-entering surface 62 can be a burnished surface done by special cuffing tools. After the light of the light source module 70 illuminate on the light-entering surface 62, the light is guided obliquely towards a single direction in the light-guide plate 60, possibly towards left or towards right. In the present embodiment, left oblique is used as an example. Consequently, the luminance on the bottom-left corner of the light-guide plate 60 will increase inevitably, while the luminance on the bottom-right corner of the light-guide plate 60 will decrease correspondingly. Thereby, the light source module 70 is adapted at the off-center position of the light-entering surface 62 to make the installation direction Id of the centerline C1 of the effective light-emitting area 625 relative to the centerline C2 of the light-entering surface be opposite to the burnishing direction Bd of the burnished surface. In this example, the light source module 70 is adapted at the position center-right to the light-entering surface, so that the luminance on the bottom-left and the bottom-fight corners is even.

The present invention further includes a reflection hood 80 and a plurality of optical thin films 90. The reflection hood 80 is adapted on one side of the light-guide plate 60 to contain the light source module 78. The plurality of optical thin films 90, which comprises a V-cut optical thin film 93 and a diffusion sheet 96, is adapted on top of the light-guide plate 60.

Figure 5:
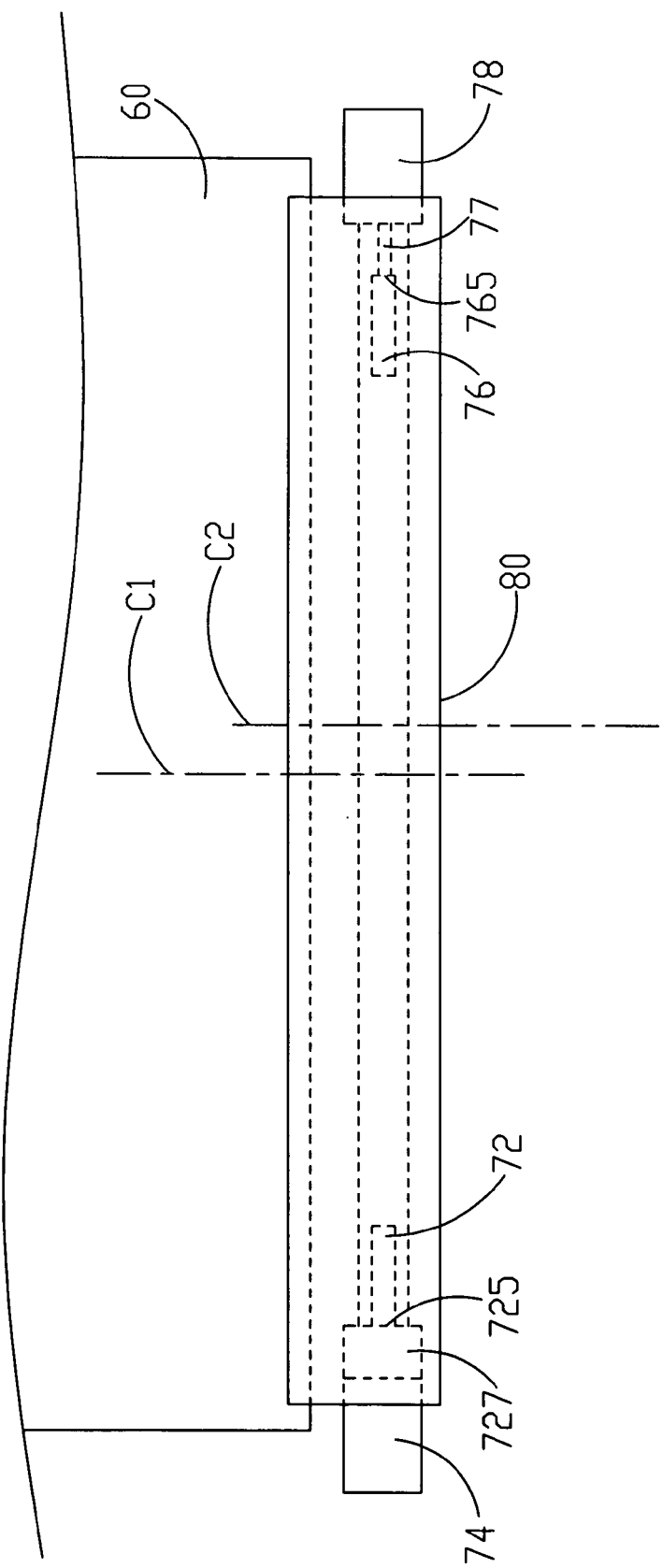
FIG. 5 is a structural schematic diagram of a backlight structure according to another preferred embodiment of the present invention.

Please refer to FIG. 5, which is a structural schematic diagram of a backlight structure according to another preferred embodiment of the present invention. The present embodiment differs from the previous one in that the preset one adjusts the lengths of the insulating sleeves to provide luminance for the bottom-left or the bottom-right corners, as well as accompanying a surface process on the light-entering surface to balance the luminance on both said corners. The light source module 70 of the present embodiment includes a lamp 71, which is adapted at the center position of the light-entering surface 62. Internal to and external to both sides of the lamp 71, a first electrode 72, a first insulating sleeve 74, a second electrode 76, and a second insulating sleeve 78 are installed, respectively. The first insulating sleeve 74 covers part of the lamp 71, and a shielding part 727 of the first insulating sleeve 74 shields the end 725 of the first electrode 72 of the lamp 71. The second insulating sleeve 78 covers part of the lamp 71 but does not shield the end 765 of the second electrode 76. That is to say, there is no shielding part on the second insulating sleeve 78 so that part of the conducting wire 77 connecting to the second electrode 76 is exposed. Consequently, reducing the shielding part 727 will help to increase the effective light-emitting area 625 of the lamp 71, and to stagger the centerline C1 of the effective light-emitting area 625 and the centerline C2 of the light-entering surface 62. In the present embodiment, light tends to propagate towards the left side. Thereby, the luminance on the bottom-left corner of the light-guide plate 60 will increase inevitably, while that on the bottom-right corner will decrease inevitably.

Accordingly, the second insulating sleeve 78 covers part of the lamp 71 and does not shield the end 765 of the second electrode 76, so that the area that the second insulating sleeve 78 covers the lamp 71 is smaller than the area that the first insulating sleeve 74 covers the lamp 71. Thereby, part of the conducting wire 77 connecting to the second electrode 76 is exposed, and the light emitted by the lamp 71 will be reflected via the reflection hood 80 to reduce the opportunity of being blocked by the second insulating sleeve 78. Hence, the illuminating range if the lamp 71 will be increased. The disposal of distinct center positions of the effective light-emitting area and the light-entering area is thus formed. In the technology described above, the function described above can be achieved by reducing the length of the second insulating sleeve 78, or by moving the position of coverage.

Figure 6:
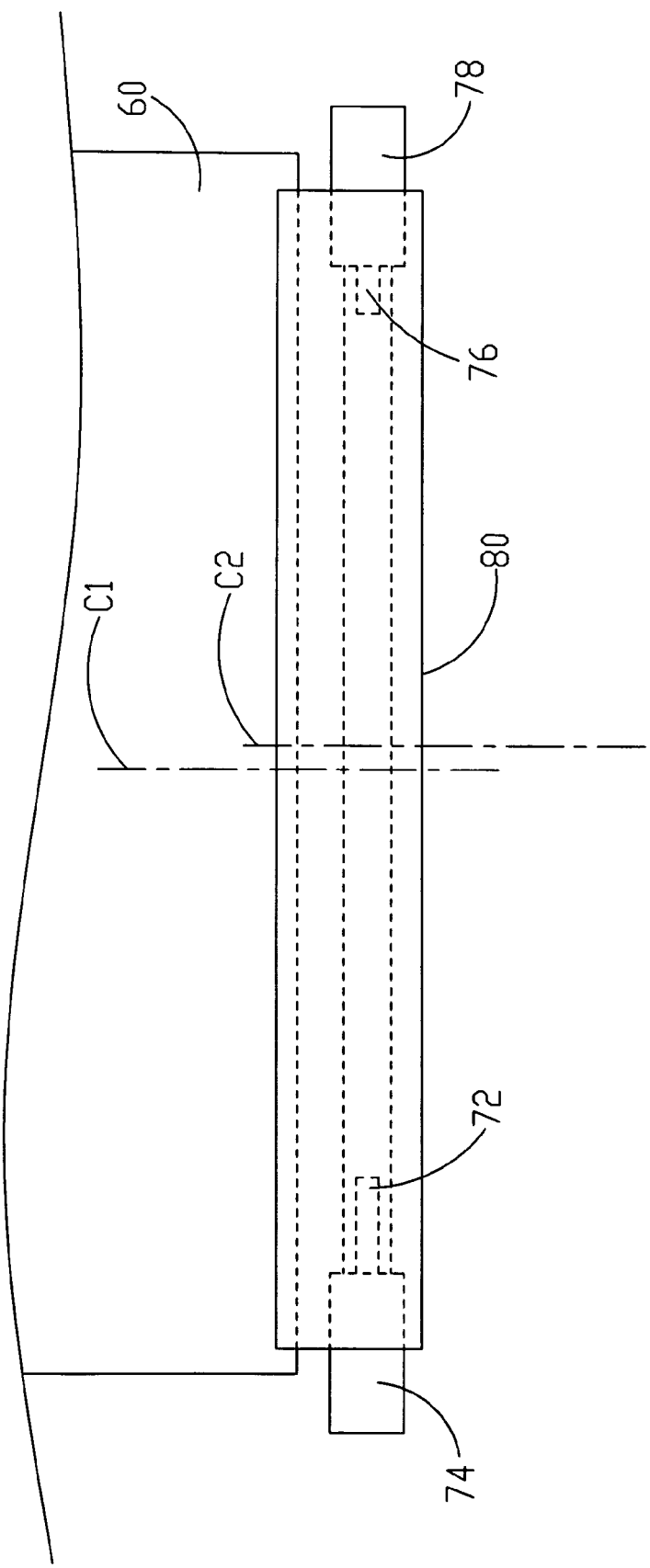
FIG. 6 is a structural schematic diagram of a backlight structure according to another preferred embodiment of the present invention.

Please refer to FIG. 6, which is a structural schematic diagram of a backlight structure according to another preferred embodiment of the present invention. The present embodiment differs from the previous one in that the preset one adjusts the lengths of the electrodes to provide luminance for the bottom-left or the bottom-right corners, as well as accompanying a surface process on the light-entering surface to balance the luminance on both said corners. Internal to both sides of the lamp 71, a first electrode 72 and a second electrode 76 are installed, respectively. The length of the first electrode 72 is longer than that of the second electrode 76. Because the first electrode 72 and the second electrode 76 do not radiate light themselves, therefore the light emitted from the lamp 71 will be sheltered by the first electrode 72 and the second electrode 76. Consequently, reducing the lengths of electrodes will be beneficial to increase the effective light-emitting area 625, as well as to stagger the centerline C1 of the effective light-emitting area 625 and the centerline C2 of the light-entering surface 62.

In the regard of the present embodiment, when the light-entering surface 62 is a burnished surface, the light is guided obliquely towards a single direction in the light-guide plate 60. Taking left oblique as an example, the luminance on the bottom-left corner of the light-guide plate 60 will increase inevitably, while the luminance on the bottom-right corner of the light-guide plate 60 will decrease correspondingly. Thereby, the length of the first electrode 72 is made to be longer than that of the second electrode 76, that is, to shorten the length of the second electrode 76, so that the effective light-emitting area 625 to the right of the lamp 71 is increased to enhance the luminance of the light-guide plate 60 on the bottom-right corner.

To sump up, the backlight structure according to the present invention comprises a reflector plate, a light-guide plate, and a light source module. The light-guide plate is adapted on the reflector plate. There is a light-entering surface in one side of the light-guide plate. Moreover, the light source module is adapted at the off-center position of the light-entering surface, and the effective light-emitting area of the light source module is smaller than the area of the light-entering surface. If the light source module is a lamp, the lamp is adapted at the center position of the light-entering surface. Internal to and external to both sides of the lamp, a first electrode, a first insulating sleeve, a second electrode, and a second insulating sleeve are installed, respectively. The first insulating sleeve covers part of the lamp, and shields the end of the first electrode of the lamp. The second insulating sleeve covers part of the lamp but does not shield the end of the second electrode. Alternatively, internal to both sides of the lamp, a first electrode and a second electrode are installed, respectively. The length of the first electrode is shorter than that of the second electrode. Thereby, the effective light-emitting area of the lamp is increased, and the luminance on the bottom-left and the bottom-right corners can further balanced.

Accordingly, the present invention conforms to the legal requirements owing to its novelty, unobviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A backlight structure, comprising:
   a light-guide plate having two opposite short sides and two opposite long sides; and
   an elongated light source module having an effective light-emitting area;
   wherein the effective light-emitting area has a centerline being transverse to a longitudinal axis of the elongated light source module,
   one of the long sides of the light-guide plate has a light-entering surface,
   the light-entering surface has a centerline being parallel to the centerline of the effective light-emitting area of the elongated light source module;
   the centerline of the effective light-emitting area of the elongated light source module is displaced at a predetermined distance from the centerline of the light-entering surface of the light-guide plate,
   a first electrode of the elongated light source module is disposed on one side of the centerline of the light-entering surface and a second electrode of the elongated light source module is disposed on the other side of the centerline of the light-entering surface, and
   a length of the first electrode disposed closer to the centerline of the light-entering surface is longer than a length of the second electrode of the elongated light source module.

2. The backlight structure in claim 1, wherein the light-guide plate comprises a V-cut light-guide plate.

3. The backlight structure in claim 2, wherein the centerline of a long side of the effective light emitting area is parallel with a centerline of each V-cut of the V-cut light-guide plate, and the centerline of the V-cut is along the top edge of the V-cut.

4. The backlight structure in claim 2, further comprising at least one optical thin film adapted on the light-guide plate.

5. The backlight structure in claim 4, wherein the optical thin film comprises a V-cut optical thin film.

6. The backlight structure in claim 4, wherein the optical thin film comprises a diffusion sheet.

7. The backlight structure in claim 1, wherein the light source module comprises:
   a cold cathode lamp; and
   at least two insulating sleeves disposed on both sides of the cold cathode lamp respectively, one of the two insulating sleeves having a shielding part extending to and covering the inner side of the cold cathode lamp.

8. The backlight structure in claim 7, wherein the light source module further comprises a reflection hood adapted on the light-entering surface, and the cold cathode lamp is installed in the reflection hood.

9. The backlight structure in claim 1, wherein the light source module comprises:
   a cold cathode lamp having
   at least two insulating sleeves slipped on both sides of the first electrode and the second electrode.

10. The backlight structure in claim 9, wherein the light source module further comprises a reflection hood adapted on the light-entering surface, and the cold cathode lamp is installed in the reflection hood.

11. The backlight structure in claim 1, wherein the area of the effective light-emitting area of the light source module is smaller than the area of the light-entering surface.

12. The backlight structure in claim 1, wherein the light-entering surface of the light-guide plate is a burnished surface.

13. The backlight structure in claim 12, wherein the installation direction of the centerline of the effective light-emitting area relative to the centerline of the light-entering surface is opposite to the burnishing direction of the burnished surface.

14. The backlight structure in claim 12, wherein the effective light-emitting area of the light source module and the burnished surface of the light guide plate are adapted asymmetrically.

15. A backlight structure, comprising:
   a light-guide plate having two opposite short sides and two opposite long sides; and
   an elongated light source having an effective light-emitting area;
   wherein the effective light-emitting area has a centerline being transverse to a longitudinal axis of the elongated light source,
   one of the long sides of the light-guide plate has a light-entering surface,
   the light-entering surface has a centerline being parallel to the centerline of the effective light-emitting area of the elongated light source;
   the centerline of the effective light-emitting area of the elongated light source is displaced at a predetermined distance from the centerline of the light-entering surface of the light-guide plate,
   a first electrode of the elongated light source is disposed on one side of the centerline of the light-entering surface and a second electrode of the elongated light source is disposed on the other side of the centerline of the light-entering surface, and
   a length of the first electrode disposed closer to the centerline of the light-entering surface is longer than a length of the second electrode of the elongated light source.

16. The backlight structure in claim 15, wherein the light source comprises:
   a cold cathode lamp; and
   at least two insulating sleeves disposed on both sides of the cold cathode lamp respectively, one of the two insulating sleeves having a shielding part extending to and covering the inner side of the cold cathode lamp.

17. The backlight structure in claim 15, wherein the light source comprises:
   a cold cathode lamp having
   at least two insulating sleeves slipped on both sides of the first electrode and the second electrode.

18. The backlight structure in claim 15, wherein the area of the effective light-emitting area of the light source is smaller than the area of the light-entering surface.

19. The backlight structure in claim 15, wherein the light-entering surface of the light-guide plate is a burnished surface.

20. The backlight structure in claim 19, wherein the installation direction of the centerline of the effective light-emitting area relative to the centerline of the light-entering surface is opposite to the burnishing direction of the burnished surface.

21. The backlight structure in claim 19, wherein the effective light-emitting area of the light source and the burnished surface of the light guide plate are adapted asymmetrically.

22. The backlight structure in claim 15, wherein the light-guide plate is each V-cut light-guide plate, the centerline of a long side of the effective light emitting area is parallel with a centerline of each V-cut of the V-cut light-guide plate, and the centerline of the V-cut is along the top edge of the V-cut.

* * * * *